United States Patent
Vetters et al.

(10) Patent No.: US 10,294,809 B2
(45) Date of Patent: May 21, 2019

(54) GAS TURBINE ENGINE WITH COMPLIANT LAYER FOR TURBINE SHROUD MOUNTS

(71) Applicants: Rolls-Royce Corporation, Indianapolis, IN (US); Rolls-Royce North American Technologies, Inc., Indianapolis, IN (US)

(72) Inventors: Daniel K. Vetters, Indianapolis, IN (US); Jack D. Petty, Indianapolis, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 600 days.

(21) Appl. No.: 15/065,256

(22) Filed: Mar. 9, 2016

(65) Prior Publication Data
US 2017/0260869 A1    Sep. 14, 2017

(51) Int. Cl.
| F01D 11/22 | (2006.01) |
| F01D 11/08 | (2006.01) |
| F01D 11/20 | (2006.01) |
| F01D 11/02 | (2006.01) |

(52) U.S. Cl.
CPC ............ *F01D 11/08* (2013.01); *F01D 11/025* (2013.01); *F01D 11/20* (2013.01); *F01D 11/22* (2013.01); *F05D 2220/323* (2013.01); *F05D 2240/11* (2013.01); *F05D 2260/38* (2013.01); *F05D 2300/501* (2013.01); *F05D 2300/6033* (2013.01); *Y02T 50/672* (2013.01)

(58) Field of Classification Search
CPC ........ F01D 11/08; F01D 11/025; F01D 11/20; F01D 11/22
See application file for complete search history.

(56) References Cited

U.S. PATENT DOCUMENTS

| 6,514,046 | B1 | 2/2003 | Morrison et al. |
| 6,808,363 | B2 | 10/2004 | Darkins, Jr. et al. |
| 7,090,459 | B2 | 8/2006 | Bhate et al. |
| 7,229,246 | B2* | 6/2007 | Ghasripoor ........... F04D 29/126 277/413 |
| 7,258,942 | B2 | 8/2007 | Chou et al. |
| 7,497,443 | B1 | 3/2009 | Steinetz et al. |
| 8,132,442 | B2 | 3/2012 | Merrill et al. |
| 8,206,098 | B2 | 6/2012 | Prill et al. |

(Continued)

FOREIGN PATENT DOCUMENTS

| DE | 102008007321 A1 | 8/2009 |
| EP | 2960440 A1 | 12/2015 |

OTHER PUBLICATIONS

European Search Report completed Jul. 4, 2017 and issued in connection with European Patent Application No. 17158171.3.

*Primary Examiner* — Justin D Seabe
*Assistant Examiner* — Sabbir Hasan
(74) *Attorney, Agent, or Firm* — Barnes & Thornburg LLP

(57) ABSTRACT

A turbine shroud for use in a gas turbine engine includes a carrier, a blade track segment, and a load-distribution system. The carrier is arranged around a central axis of the turbine shroud. The blade track segment is configured to be supported by the carrier. The load-distribution system is positioned between the carrier and the blade track segment to distribute loads transmitted between the carrier and the blade track segment.

15 Claims, 6 Drawing Sheets

(56) References Cited

U.S. PATENT DOCUMENTS 9,175,579 B2 * 11/2015 Franks .................. F01D 25/246
2004/0188947 A1    9/2004 Paprotna
2006/0067815 A1    3/2006 Ghasripoor et al.
2013/0156550 A1    6/2013 Franks et al.
2014/0250893 A1    9/2014 Chan et al.

* cited by examiner

GAS TURBINE ENGINE WITH COMPLIANT LAYER FOR TURBINE SHROUD MOUNTS

FIELD OF THE DISCLOSURE

The present disclosure relates generally to gas turbine engines, and more specifically to turbine shrouds used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft, fan, or propeller. Left-over products of the combustion reaction are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies.

Some shrouds are formed by a number of blade track segments arranged circumferentially adjacent to one another to form a hoop and an annular carrier arranged around the hoop of blade track segments. Such shrouds sometimes include components having different rates of thermal expansion which may cause the components to experience areas of localized stress during heating and cooling of the shroud.

SUMMARY

The present disclosure may comprise one or more of the following features and combinations thereof.

A turbine shroud may include a metallic carrier, a blade track segment, a compliant member, and a plurality of rigid load pads. The metallic carrier may be arranged around at least a portion of a central axis of the turbine shroud. The metallic carrier may have a first mating surface. The blade track segment may comprise ceramic material and may have a second mating surface. The blade track segment may be configured to be supported by the first mating surface of the metallic carrier. The compliant member may be engaged with the first and second mating surfaces. The compliant member may have an uncompressed thickness and may be configured to compress to distribute loads transmitted between the first mating surface of the carrier and the second mating surface of the blade track segment during use of the turbine shroud.

The plurality of rigid load pads may be coupled to one of the first and second mating surfaces. Each of the plurality of rigid load pads may have a second thickness that is less than the uncompressed first thickness of the compliant member. The plurality of rigid load pads may be configured to engage the other of the first and second mating surfaces when the compliant member is compressed to the second thickness to block further movement of the blade track segment relative to the metallic carrier.

In some embodiments, the compliant member may include a radial outer surface and a radial inner surface spaced apart radially from the radial outer surface. The complaint member may be formed to define a plurality of receiver apertures extending between the radial outer surface and the radial inner surface of the complaint member. Each receiver aperture may be shaped to receive a corresponding rigid load pad.

In some embodiments, the plurality of rigid load pads may include at least three rigid load pads. In some embodiments, the metallic carrier and the load pads may be monolithically formed.

In some embodiments, the turbine shroud further includes an active tip clearance system. The active tip clearance system may be configured to control radial expansion and contraction of the metallic carrier relative to the central axis.

In some embodiments, the complaint member may be formed to include an air passage. The air passage may extend through the compliant member to allow fluid communication through the compliant member.

In some embodiments, the turbine shroud may include a first metallic sheet and a second metallic sheet. The first metallic sheet may be positioned between the complaint member and the first mating surface. The second metallic sheet may be positioned between the complaint member and the second mating surface.

According to another aspect of the present disclosure, a turbine shroud may include a carrier, a blade track, and a load-distribution system. The carrier may be arranged around a central axis of the turbine shroud. The carrier may have a first mating surface. The blade track segment may have a second mating surface configured to be supported by the first mating surface. The load-distribution system may be configured to distribute loads transmitted between the second mating surface of the blade track segment and the first mating surface of the carrier. The load-distribution system may include a compliant member engaged with the first and second mating surfaces and a plurality of rigid load pads.

The compliant member may have an uncompressed thickness. Each of the plurality of rigid load pads may have a second thickness that is less than the uncompressed thickness. The plurality of rigid load pads may be configured to engage the first and second mating surfaces in response to the compliant member being compressed to the second thickness.

In some embodiments, the compliant member may include an outer surface and an inner surface spaced apart from the outer surface. The complaint member may be formed to define a plurality of receiver apertures extending between the outer surface and the inner surface of the complaint member. Each receiver aperture may be shaped to receive a corresponding rigid load pad.

In some embodiments, the load-distribution system may be formed to include an air passage extending through the load-distribution system to allow fluid communication through the load-distribution system. In some embodiments, the load-distribution system may include a first foil sheet positioned between the complaint member and the first mating surface and a second foil sheet positioned between the complaint member and the second mating surface.

In some embodiments, the plurality of rigid load pads may include at least three rigid load pads. In some embodiments, the metallic carrier and the load pads may be monolithically formed.

In some embodiments, the turbine shroud further includes an active tip clearance system. The active tip clearance system may be configured to control expansion and contraction of the carrier relative to the central axis.

According to another aspect of the present disclosure, the assembly may include a first component, a second component, and a load-distribution system. The first component may be arranged around at least a portion of a central axis of the gas turbine engine. The second component may comprise ceramic matrix composite materials and may be in confronting relation with the first component. The load-distribution system may be positioned between the first component and the second component.

The load-distribution system may include a compliant member that extends between the first and second components and a plurality of rigid load pads. The compliant member may have an uncompressed thickness. Each of the plurality of rigid load pads may have a second thickness that is less than the uncompressed thickness. The plurality of rigid load pads may be configured to engage the first and second components in response to the compliant member being compressed to the second thickness.

In some embodiments, the compliant member may include a first surface and a second surface spaced apart from the first surface. The complaint member may be formed to define a plurality of receiver apertures extending between the first surface and the second surface of the complaint member. Each receiver aperture may be shaped to receive a corresponding rigid load pad.

In some embodiments, the load-distribution system may be formed to include an air passage extending through the load-distribution system. In some embodiments, the load-distribution system may include a first sheet positioned between the complaint member and the first component and a second sheet positioned between the complaint member and the second component.

In some embodiments, the first component and the load pads may be monolithically formed. In some embodiments, each rigid load pad may be about equally spaced apart from adjacent rigid load pads.

These and other features of the present disclosure will become more apparent from the following description of the illustrative embodiments.

DETAILED DESCRIPTION OF THE DRAWINGS

Figure 1:
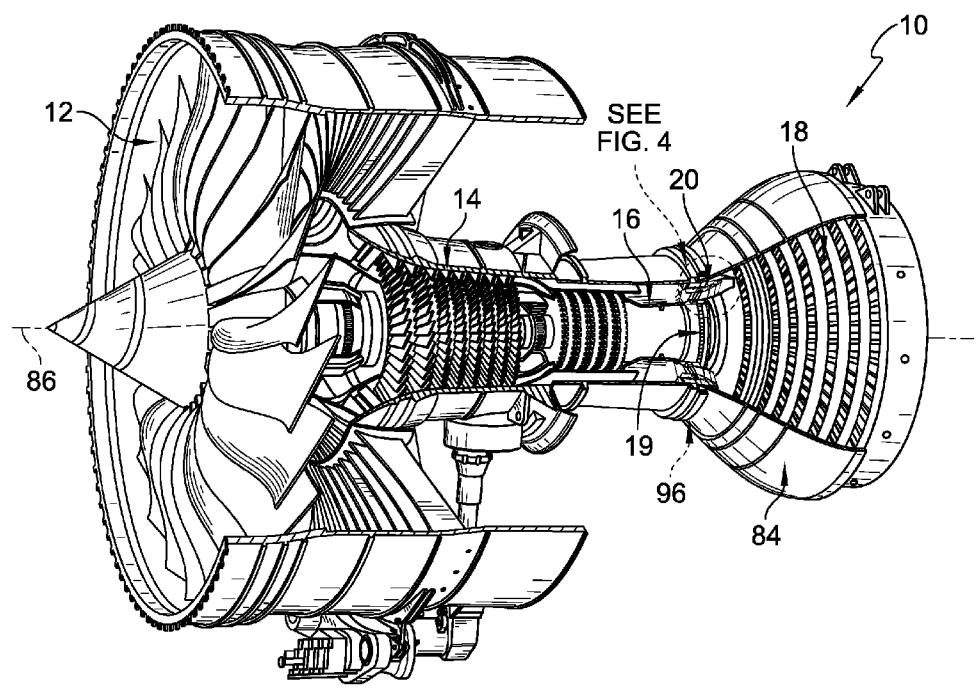
FIG. 1 is a cut-away perspective view of a gas turbine engine including a fan, a compressor, a combustor, and a turbine, the turbine includes turbine shrouds having components with different rates of thermal expansion which may cause the components to experience areas of localized stress during operation of the engine.

For the purposes of promoting an understanding of the principles of the disclosure, reference will now be made to a number of illustrative embodiments illustrated in the drawings and specific language will be used to describe the same.

Figure 2:
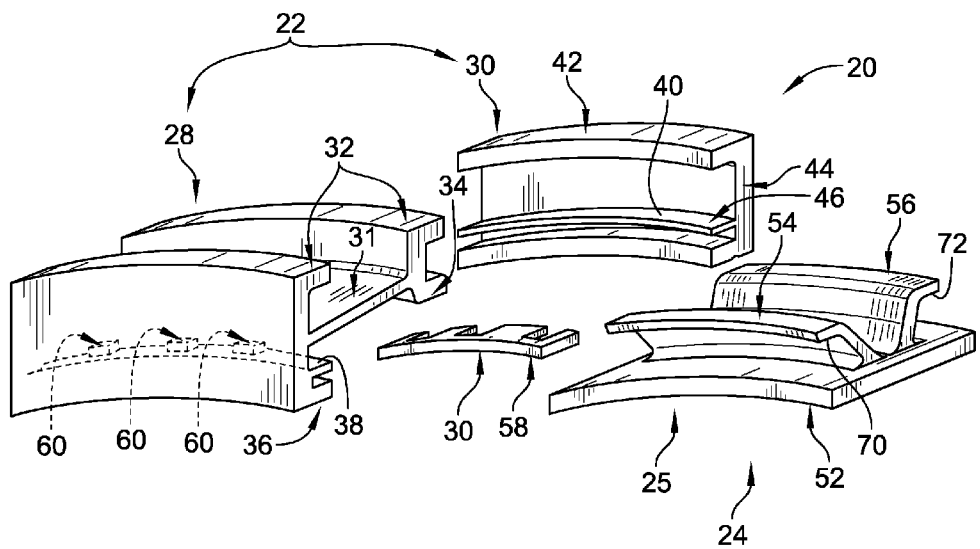
FIG. 2 is an exploded perspective view of a portion of a turbine shroud adapted for use in the gas turbine engine of FIG. 1, the turbine shroud includes a carrier, a blade track having a plurality of blade track segments configured to be supported by the carrier, and a load-distribution system configured to distribute forces between the carrier and the turbine blade segment to lower any areas of localized stress in the carrier and blade track.

An illustrative aerospace gas turbine engine 10 includes a turbine 18 configured to power the gas turbine engine 10 as shown in FIG. 1. The turbine 18 includes at least one turbine wheel assembly 19 and a turbine shroud 20 arranged around the turbine wheel assembly 19 as shown in FIGS. 1 and 2. The turbine shroud 20 includes a carrier 22, a blade track 24, and a load-distribution system 26 as shown in FIG. 2. The carrier 22 is configured to support the blade track 24 in position adjacent blades 21 of the turbine wheel assembly 19 as shown in FIG. 4. The blade track 24 blocks combustion products from passing over the blades 21 and insulates the carrier 22 from the hot combustion products. The load-distribution system 26 includes a compliant member 58 and a plurality of rigid load pads 60 positioned between the carrier 22 and the blade track 24 to distribute forces transmitted between the carrier 22 and the blade track 24 as suggested in FIGS. 3-6.

Figure 3:
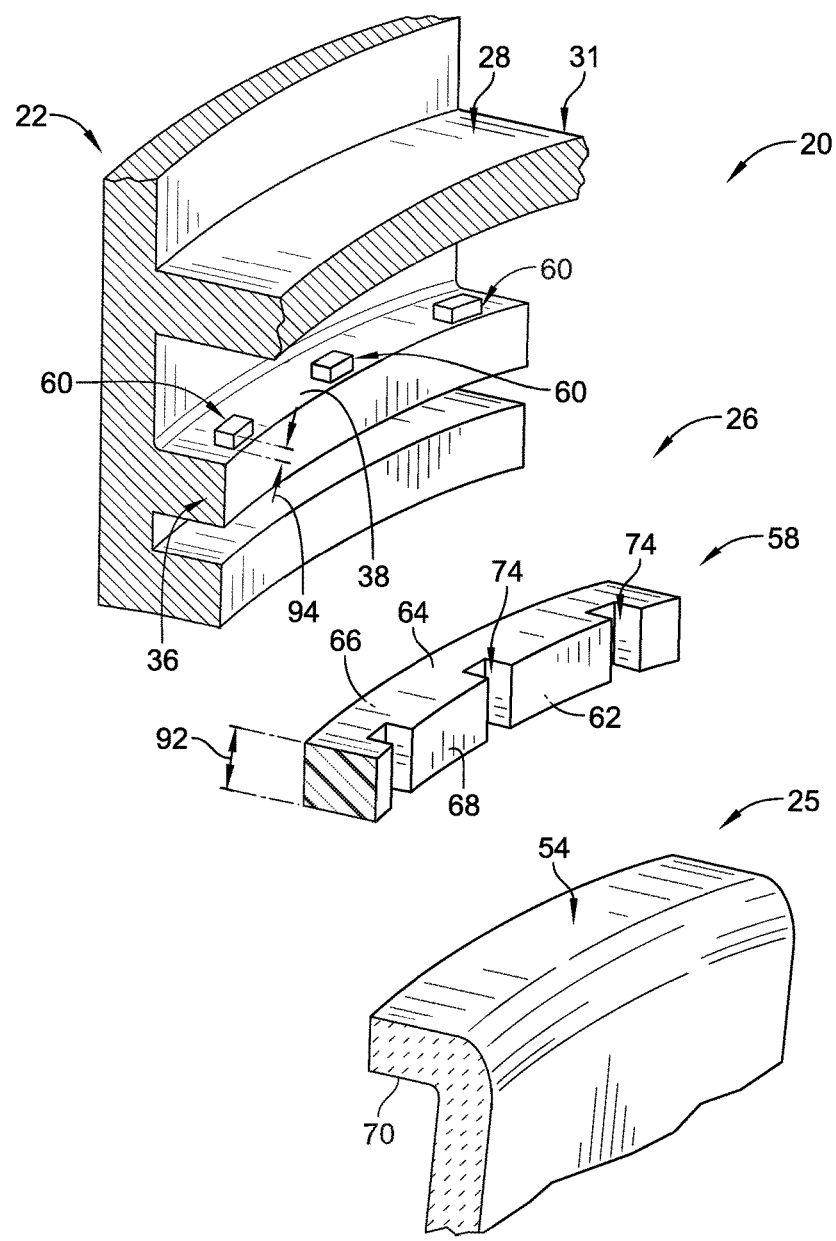
FIG. 3 is an enlarged exploded perspective view of a portion of the turbine shroud of FIG. 2 showing, from top to bottom, a forward bracket of the carrier, the load-distribution system including a complaint member and a plurality of rigid load pads that are coupled to the forward bracket, and a forward hanger of the blade track segment.
Figure 4:
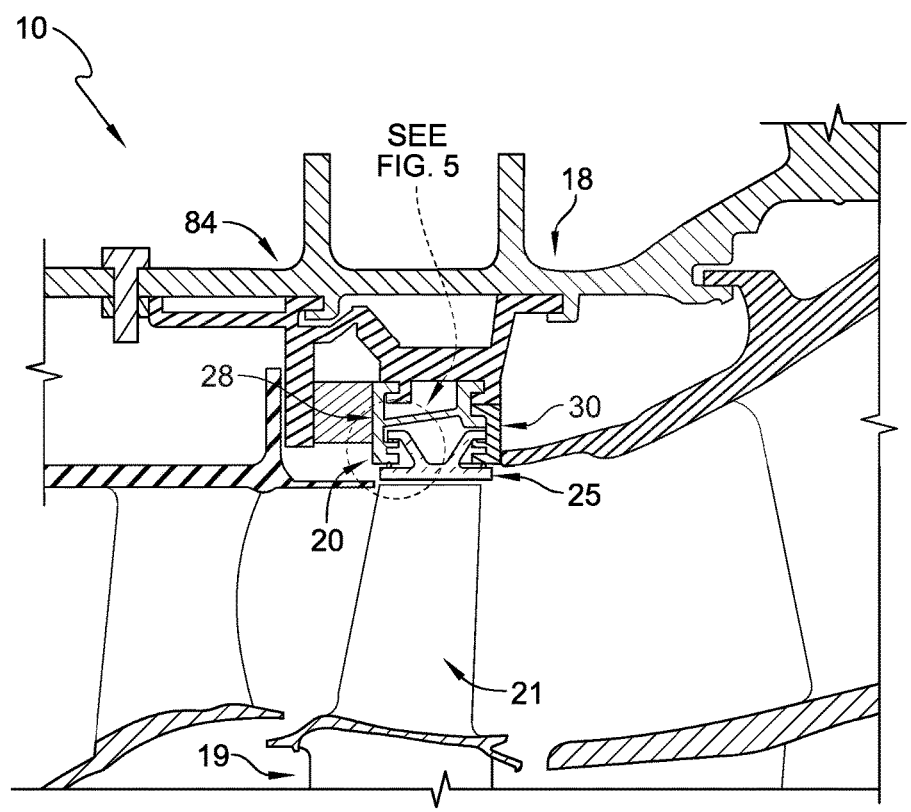
FIG. 4 is a partial sectional view of the gas turbine engine of FIG. 1 showing the blade track segment supported by the carrier and suggesting that the blade track segment forms a portion of a flow path for hot high-pressure combustion products conducted through the turbine of the gas turbine engine.

The illustrative carrier 22 comprises metallic materials while the blade track 24 comprises ceramic materials as shown in FIG. 3. As such, the carrier 22 and the blade track 24 may have different rates of thermal expansion which cause the carrier 22 and the blade track 24 to grow relative to one another during operation of the engine 10. Relative growth between the carrier 22 and the blade track 24 may cause areas of localized stress in the ceramic blade track 24 which may damage and/or break the ceramic blade track 24. The load-distribution system 26 is configured to distribute loads across the blade track 24 to lower any areas of localized stress.

The illustrative aerospace gas turbine engine 10 includes a fan 12, a compressor 14, a combustor 16, and the turbine 18 as shown in FIG. 1. The fan 12 is driven by the turbine 18 and provides thrust for propelling an aircraft. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 86 of the engine 10 and drive the compressor 14 and the fan 12. The turbine 18 includes the turbine wheel assembly 19 and the turbine shroud 20 as shown in FIG. 4. The illustrative turbine shroud 20 includes the carrier 22, the blade track 24, and the load-distribution system 26 as shown in FIG. 2.

The carrier 22 includes a carrier segment 28 and a retainer 30 spaced apart axially from the carrier segment 28 as shown in FIG. 2. The carrier segment 28 is configured to support a forward end of the blade track 24 and the retainer 30 is configured to support an aft end of the blade track 24 to position the blade track 24 about the central axis 86.

In the illustrative embodiment, the carrier segment 28 includes case hangers 32, a web 31, a retainer bracket 34, and a forward bracket 36 as shown in FIG. 2. The case hangers 32 are spaced apart from one another and are connected by the web 31. The case hangers 32 couple the carrier segment 28 to an outer case 84 of the engine 10 as shown in FIG. 4. The retainer bracket 34 is illustratively coupled to the web 31 and positioned to engage the retainer 30 of the carrier 22 to couple the retainer 30 with the carrier segment 28. The forward bracket 36 extends axially aft toward the retainer bracket 34 as shown in FIG. 2. The forward bracket 36 includes an outwardly facing mating surface 38 arranged to face and support an inwardly-facing mating surface 70 of the blade track 24 as suggested in FIG. 3.

The retainer 30 includes a hanger 42, a body 44 coupled to the hanger 42, and an aft bracket 46 coupled to the body 44 as shown in FIG. 2. The hanger 42 engages with the retainer bracket 34 of the carrier segment 28 to couple the retainer 30 with the carrier segments 28 as shown in FIG. 4. The aft bracket 46 is positioned to support aft hangers 56 of the blade track 24. The aft bracket 46 extends axially forward toward the carrier segment 28 as shown in FIG. 2. The aft bracket 46 includes an outwardly facing mating surface 40 arranged to face an inwardly-facing mating surface 72 of the blade track 24 as suggested in FIG. 2.

The blade track 24 is generally concentric with and nests into the carrier 22 along the central axis 86 of the gas turbine engine 10 as suggested in FIGS. 2 and 4. The illustrative blade track 24 is formed from a plurality of blade track segments 25 which cooperate to form the hoop shaped blade track 24 as suggested in FIG. 2. Each blade track segment 25 includes a runner 52, the forward hanger 54, and the aft hanger 56 as shown in FIG. 2. The runner 52 is configured to block hot gasses from passing over the blades 21 without interacting with the blades 21 as suggested in FIG. 4. The forward hanger 54 extends radially outward and axially forward from the runner 52 as shown in FIG. 2. The aft hanger 56 extends radially outward and axially aft from the runner 52.

Figure 5:
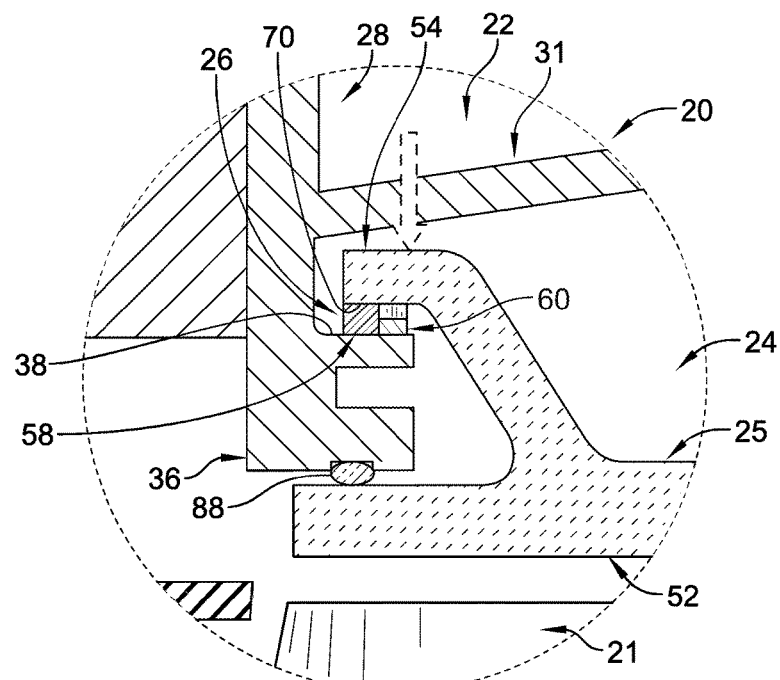
FIG. 5 is a detail view of FIG. 4 showing the load-distribution system positioned between the carrier and the blade track segment, the complaint member being partially compressed to distribute forces between the blade track segment and the carrier.
Figure 6:
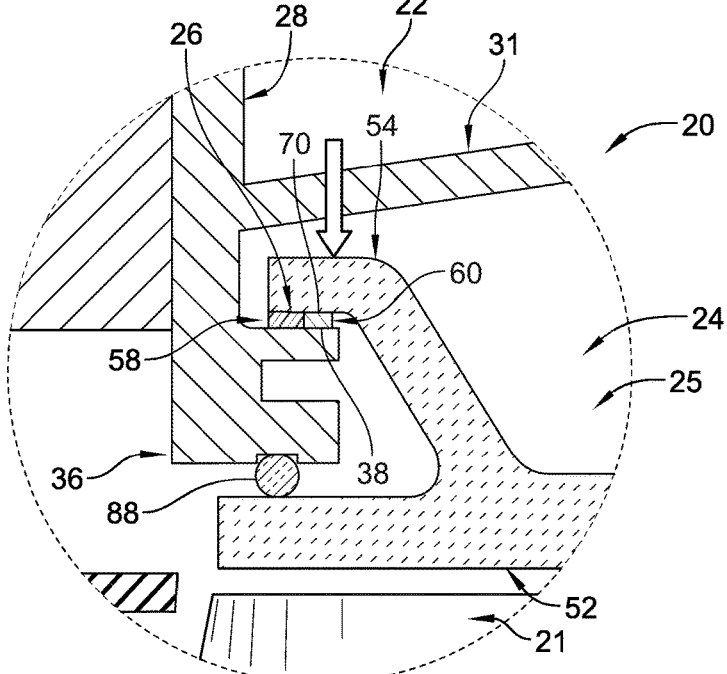
FIG. 6 is a detail view similar to FIG. 5 showing the complaint member fully compressed to cause the plurality of rigid load pads to engage the carrier and the blade track segment to transmit forces between the blade track segment and the carrier at predetermined locations.

The forward hanger 54 includes the inwardly-facing mating surface 70 arranged to face the outwardly-facing mating surface 38 of the forward bracket 36 of the carrier segment 28 as shown in FIGS. 5 and 6. The aft hanger 56 includes the inwardly-facing mating surface 72 arranged to face the outwardly-facing mating surface 40 of the aft bracket 46 of the retainer 30.

Each blade track segment 25 is illustratively made from a ceramic material; and, more particularly, a ceramic matrix composite (CMC) including silicon carbide fibers and silicon carbide matrix. For purposes of this application, a ceramic material is any monolithic ceramic or composite in which at least one constituent is a ceramic. In other embodiments, the blade track segments 25 may be made of other metallic, non-metallic, or composite materials with low coefficients of thermal expansion.

The load-distribution system 26 is configured to be located between the carrier 22 and the blade track segment 25 as suggested in FIG. 3. In the illustrative embodiment, the turbine shroud 20 includes a forward load-distribution system 26 positioned between the carrier segment 28 and the forward hanger 54 of the blade track segment 25. In other embodiments, an aft load-distribution system 26 is positioned between the retainer 30 and the aft hanger 56 of the blade track segment 25.

The illustrative load-distribution system 26 includes a compliant member 58 and a plurality of load pads 60 as shown in FIG. 3. The compliant member 58 is configured to compress when a load is applied to the compliant member 58 to distribute loads transmitted between the mating surface 38 of the carrier 22 and the mating surface 70 of the blade track segment 25 during use of the turbine shroud 20. The load pads 60 are configured to limit compression of the compliant member 58 to limit movement of the blade track segment 25 relative to the carrier 22 and further configured to transmit relatively large forces between the carrier 22 and the blade track segment 25.

The compliant member 58 has a modulus of elasticity in the direction of compression of between about, or specifically, 0.3 MPa to about, or specifically, 20,000 MPa. However, the modulus of elasticity of the compliant member 58 may be another suitable value less than the modulus of elasticity of the load pads 60. The compliant member 58 includes an inner radial surface 62, an outer radial surface 64 spaced apart radially from the inner radial surface 62, a forward surface 66 extending between the inner and outer radial surfaces 62, 64, and an aft surface 68 axially spaced apart from the forward surface 66 as shown in FIG. 3. The inner radial surface 62 is configured to engage the mating surface 38 of the carrier 22. The outer radial surface 64 is configured to engage the mating surface 70 of the blade track segment 25. When no load is applied to the compliant member 58, the complaint member has an uncompressed thickness 92 defined between the inner radial surface 62 and the outer radial surface 64 as shown in FIG. 3.

The illustrative compliant member 58 is formed to include a plurality of receiver apertures 74 as shown in FIG. 3. Each receiver aperture 74 is shaped to receive one of the load pads 60 as suggested in FIGS. 3 and 5. Each receiver aperture 74 extends radially through the compliant member 58 between the inner and outer radial surfaces 62, 64. In the illustrative embodiment, the receiver apertures 74 extend axially partway into the compliant member 58 from the aft surface 68 toward the forward surface 66.

In some embodiments, the compliant member 58 comprises micaboard gasket material. In some embodiments, the compliant member 58 comprises 3M's Interam material. In some embodiments, one or more of the surfaces 62, 64, 66, 68 are coated. In some embodiments, the compliant member 58 is formed to define air passages that extend through the compliant member 58 as suggested in FIG. 7. In some embodiments, the load-distribution system 26 includes metal foil sheets and the compliant member 58 is positioned between the metal foil sheets.

The load pads 60 are positioned between the mating surfaces 38, 70 of the carrier segment 28 and the forward hanger 54 of the blade track segment 25 as shown in FIG. 5. Each load pad 60 has a thickness 94 that is less than the uncompressed thickness 92 of the compliant member 58 as shown in FIG. 5. In the illustrative embodiment, the load pads 60 are rigid load pads which comprise metallic material, for example, nickel or cobalt based alloys.

In the illustrative embodiment, each load pad 60 is generally spaced apart equally from adjacent load pads 60. In the illustrative embodiment, at least three load pads 60 are associated with each blade track segment 25. As a result, at least three load pads 60 engage the blade track segment 25 in response to the compliant member 58 being fully compressed. As such, the load pads 60 create a determinant loading system so that loads are known independent of component tolerances.

In the illustrative embodiment, the load pads 60 and the carrier 22 are monolithically formed as suggested in FIG. 3. In other embodiments, the rigid load pads 60 are coupled to the mating surface 38 of the carrier segment 28. In other embodiments, the rigid load pads 60 are coupled to the mating surface 70 of the blade track segment 25. In other embodiments, the load pads 60 are spaced apart from both the carrier segment 28 and the blade track segment 25 when the compliant member 58 is uncompressed.

During operation of the gas turbine engine 10, relative growth between the carrier 22 and the blade track segment 25 may occur due to the materials, shape, and temperature of the carrier 22 and the blade track segment 25. The relative growth may cause forces to be applied to the turbine blade segment 25 and to the carrier segment 28 as suggested in FIGS. 5 and 6. In turbine shrouds without the load-distribution system 26, the forces acting on the blade track segment 25 may form areas of localized stress. As such, the localized areas of stress may damage and/or break the blade track segment. Alternatively, the blade track segment may be reinforced in some way to withstand the localized stress. However, reinforcing the blade track may limit other design choices of the blade track segment such as, for example, the material, weight, and shape of the blade track segment.

In the illustrative embodiment, the load-distribution system 26 distributes the forces acting on the turbine shroud 20 to lower any areas of localized stress as suggested in FIGS. 5 and 6. The load-distribution system 26 may help maintain multiple defined contact sites on the blade track segment 25 through a range of temperatures experienced during operation of the turbine shroud 20 as the carrier 22 and the blade track 24 expand and contract.

The forces acting on the turbine shroud 20 cause the blade track segment 25 to move radially toward the carrier segment 28 and partially compress the compliant member 58 as shown in FIG. 5. The partially compressed compliant member 58 distributes a portion of the forces across the blade track segment 25 to lower any areas of localized stress.

As the forces acting on the turbine shroud 20 grow, relative movement between the blade track segment 25 and the carrier segment 28 cause the compliant member 58 to compress further as shown in FIG. 6. In response, the compliant member 58 distributes the additional forces. If the forces continue to increase, the compliant member 58 fully compresses and the load pads 60 engage the mating surface 38 of the carrier segment 28 and the mating surface 70 of the forward hanger 54 to block further radial movement of the blade track segment 25 relative to the carrier 22.

If the forces acting on the turbine shroud 20 continue to grow after the compliant member 58 is fully compressed, the additional force load is transmitted through the load pads 60 and the forces transmitted through the compliant member 58 remain generally constant. The load pads 60 may be located relative to the blade track segment 25 and the carrier segment 28 to cause the load pads 60 to engage the predetermined areas of the blade track segment 25 and the carrier segment 28.

The forces acting on the turbine shroud 20 may vary during operation of the gas turbine engine 10. If the forces increase, the additional force is transferred through the load pads 60 to discrete areas of the blade track segment 25 and the carrier segment 28 while the force through the compliant member remains generally constant. If the forces decrease, the forces transferred through the compliant member 58 remain generally constant until the forces decrease such that the load pads 60 fully unload. As such, the amount of compression in the compliant member 58 may be fixed during an operating envelope of the engine 10. Once the load pads 60 fully unload, the compliant member 58 may expand and the blade track segment 25 may move radially away from the carrier 22.

The illustrative load pads 60 limit radial movement of the blade track segment 25 relative to the central axis 86 to a predetermined amount. In the illustrative embodiment, the load pads 60 are rigid such that the blade track segment 25 is spaced apart from the carrier segment 28 by at least the thickness 94 of the load pads 60 irrespective of the forces acting on the turbine shroud 20 as shown in FIG. 6. As such, a minimum distance between the runner 52 of the blade track segment 25 and a tip of the turbine blades 21 is known and may be used with other systems of the gas turbine engine 10 such as, for example, an active blade tip clearance system 96.

In the illustrative embodiment, circumferential seal elements 88 extend circumferentially along forward and aft sides of the carrier 22 as shown in FIGS. 4-6. The seal elements 88 are illustratively rope seals arranged radially between the carrier 22 and the blade track 24 to block gasses from passing through radial interfaces of components as shown in FIG. 5. In other embodiments, other types of seals may be used as seal elements 88.

In other embodiments, the turbine shroud 20 is made up of a number of shroud segments that extend part-way around the central axis 86 and cooperate to surround the turbine wheel assembly 19. In other embodiments, the turbine shroud 20 is annular and non-segmented to extend fully around the central axis 86 and surround the turbine wheel assembly 19. In yet other embodiments, portions of the turbine shroud 20 are segmented while other portions are annular and non-segmented.

Figure 7:
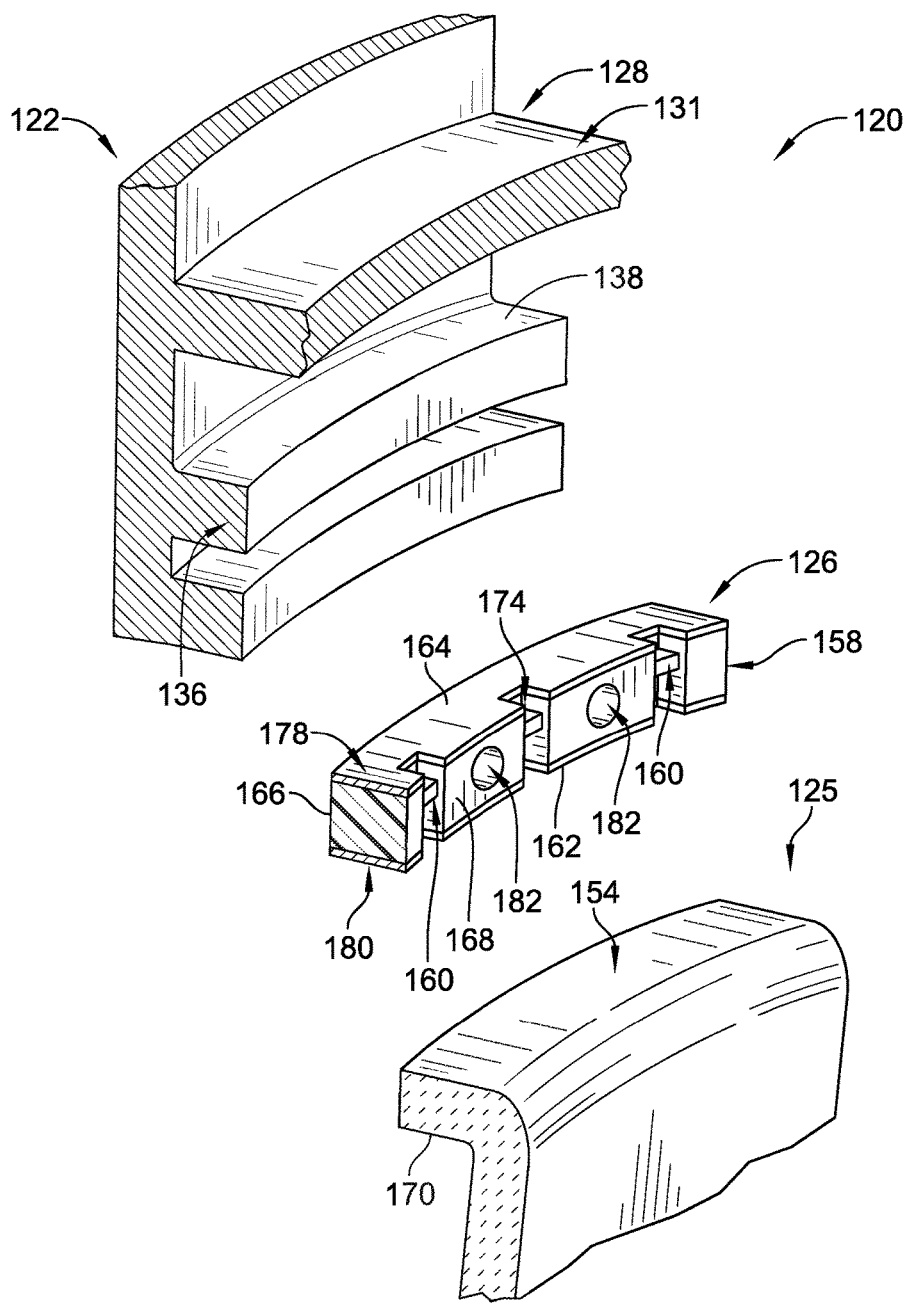
FIG. 7 is an enlarged exploded perspective view of another embodiment of a load-distribution system for use with the gas turbine engine of FIG. 1.

Another illustrative load-distribution system 126 adapted for use in the turbine shroud 20 is shown in FIG. 7. The load-distribution system 126 is substantially similar to the load-distribution system 26 shown in FIGS. 1-6 and described herein. Accordingly, similar reference numbers in the 100 series indicate features that are common between the load-distribution system 26 and the load-distribution system 126. The description of the load-distribution system 26 is hereby incorporated by reference to apply to the load-distribution system 126, except in instances when it conflicts with the specific description and drawings of the load-distribution system 126.

The load-distribution system 126 is configured to be located between the carrier 122 and the blade track segment 125 as shown in FIG. 7. The load-distribution system 126 includes the compliant member 158, the plurality of rigid load pads 160, and foil sheets 178, 180. The load pads 160 are positioned in the receiver apertures 174 and not directly coupled to the carrier 122 or the blade track segment 125 in the illustrative embodiment.

The compliant member 158 is positioned between the foil sheets 178, 180 as shown in FIG. 7. As such, the foil sheets 178, 180 contact the moving components 122, 125 of the turbine shroud 120 and reduce the wear experienced by the compliant member 158. In the illustrative embodiment, the foil sheets 178, 180 comprise metallic materials.

The compliant member 158 is formed to include air passages 182 extending through the compliant member 158 to allow fluid communication through the compliant member 158 as needed. In the illustrative embodiment, the air passages 182 are circumferentially spaced apart from the receiver apertures 174. Illustratively, the air passage 182 extends through the compliant member 158 between the forward surface 166 and the aft surface 168 as shown in FIG. 7.

Figure 8:
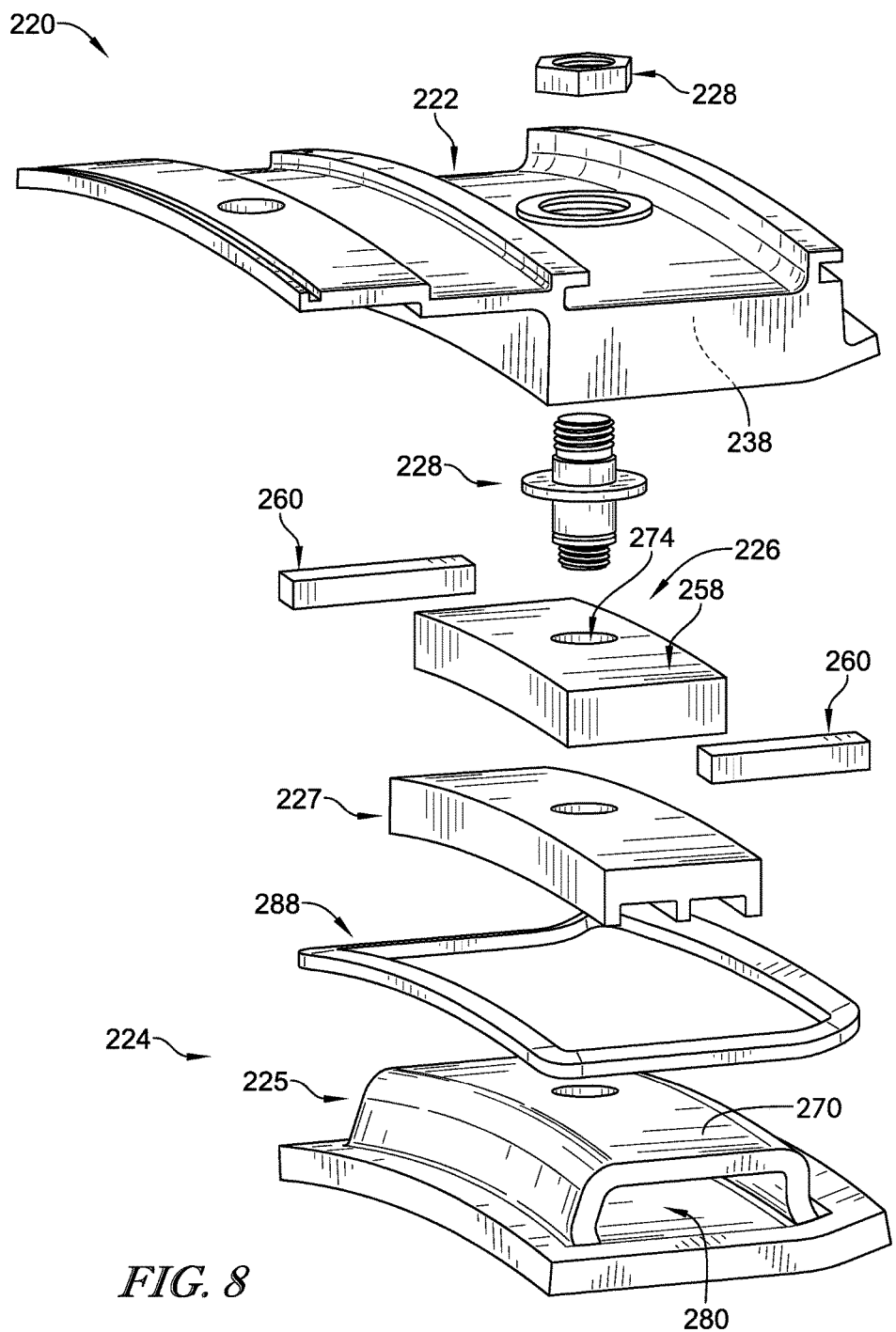
FIG. 8 is an exploded perspective view of another turbine shroud for use in the gas turbine engine of FIG. 1.

Another illustrative turbine shroud 220 adapted for use in the gas turbine engine 10 is shown in FIG. 8. The turbine shroud 220 is substantially similar to the turbine shroud 20 shown in FIGS. 1-6 and described herein. Accordingly, similar reference numbers in the 200 series indicate features that are common between the turbine shroud 20 and the turbine shroud 220. The description of the turbine shroud 20 is hereby incorporated by reference to apply to the turbine shroud 220, except in instances when it conflicts with the specific description and drawings of the turbine shroud 220.

The turbine shroud 220 includes a carrier 222, a blade track 224, and a load-distribution system 226. The blade track 224 is coupled to the carrier 222 by fasteners 228 and the load-distribution system 226 is located between the carrier 222 and the blade track 224 to distribute forces between the carrier 222 and the blade track 224.

The carrier 222 is formed to include an inwardly-facing mating surface 238 arranged to face an outwardly-facing mating surface 270 of the blade track 224 as shown in FIG. 8. The blade track 224 includes a blade track segment 225 and support 227. The support 227 is configured to slide into opening 280 and receive a portion of the fastener 228 to couple the blade track segment 225 to the carrier 222. In the illustrative embodiment, the blade track 224 further includes a seal 288 arranged around a portion of the blade track segment 225.

The load-distribution system 226 includes a compliant member 258 and at least one load pad 260 as shown in FIG. 8. Illustratively, each load pad 260 is shaft shaped and the complaint member 258 extends circumferentially between the load pads 260. During build, relative movement between the carrier 222 and the blade track 224 compresses the compliant member 258 until the load pad 260 engages the carrier 222 and the blade track 224 to block further relative movement. The compliant member 258 is formed to include a receiver aperture 274 sized to receive the fastener 228.

Ceramic matrix composite material may be stiffer than traditional metal alloys. As a result, components made from ceramic matrix composite material tend to concentrate loads at the initial contact locations rather than distributing the contact load across an entire surface. As an example, the turbine shroud 20 includes the carrier 22 comprising metallic materials and the blade track 24 comprising ceramic matrix composite materials. The hanger hooks 54 of the blade track 24 slide into hooks on the inner face of the carrier 22. Pressure loads the blade track segments 25 radially inward, with the load transferring between the ceramic matrix composite material and the metallic carrier hooks 36.

Contact between the components may occur at the three highest points of the hooks and would not be spread across the whole length of the hangers. If the locations of those three high points happened to be at undesired locations, then high stresses may be located at those locations. For comparison, metal segments tend to deflect as they are loaded such that the load is roughly spread evenly along the whole hanger surface. To address this issue, three discrete load points may be used to ensure the contact points are known and controlled. In other turbine shrouds, the mating surfaces are machined such that there are three slightly raised pads that contact at predefined locations.

The load pads are oriented axially for deterministic contact at optimum locations regardless of tolerances or movement (flattening) during operation. The load pads definitively locate the segment and the flowpath to better control blade tip clearance. The compliant member allows relatively constant load distribution throughout operation and assembly. This lowers some of the load from the load pads, which relieves some of the associated stresses from localized load transfer.

The compliant layer may need to survive at high temperatures when used with ceramic matrix composite components. The ceramic matrix composite materials may be used due to their high temperature capability. As such, temperatures at mating surfaces may be relatively hot. As a result, traditional compliant materials such as rubber may not be suitable. The use of a compliant layer between mating components can distribute the load. In this way, distributed loads may be achieved despite stiff materials like ceramic matrix composite materials and despite form tolerances on the surfaces.

A few examples of candidate materials for the compliant layer would be 3M Interam material, graphoil, and micaboard gasket material. Other high temperature gasket type materials may also be of use. These materials may take permanent and temporary set, but may retain some resiliency at temperature to accommodate slight changes in mating surface form (such as flattening). If temperatures and/or loads are too high, then the compliant layer material may not be durable and/or resilient enough to distribute the load throughout the entire life of the engine.

These compliant materials can be placed between the mating surfaces to provide the desired load distribution. The compliant layer may be positioned between entire mating surfaces or may include discrete load points, but compresses a compliant layer across the rest of the surfaces.

In some embodiments, if temperatures and loads can be handled by the compliant layer, then a compliant member with no discrete load pads may be used. The compliant layer material would be used between the mating surfaces to make up for the stiffness, surface roughness, and/or form tolerances of the ceramic matrix composite material.

In some embodiments, if temperatures and loads are too high for the compliant layer alone or if more definitive location is required, then the use of discrete load pads in conjunction with the compliant layer may be used to distribute some of the load while protecting the compliant layer from over loading. This solution may result in stress levels below those found with only discrete load points but higher than a nicely distributed load across the entire surface.

The load-distribution system limits the amount of load in the compliant layer and changes the loading of the compliant layer from load controlled to strain controlled. The height of the raised pads for the load points would be less than the compliant layer thickness. In this way, initial contact is between the compliant layer and the mating surfaces. As the parts are loaded, the compliant layer is compressed until the discrete load pads are contacted. During this time, any tolerance in the mating surface form has little impact on the load distribution due to the relatively low stiffness of the compliant layer.

The load to compress the compliant layer before contacting the load points may be the amount of load distributed across the remainder of the surface. This is load which does not need to be transferred at the discrete load points. In this manner, some of the load can be well distributed while being kept at levels which the compliant layer can withstand.

The amount of compression in the compliant layer may remain generally fixed throughout the operating envelope of the engine. As loads through the interface change during operation, the load at the discrete load points will increase and decrease. Due to the high stiffness at the discrete load points, these locations may need to fully unload before the compliant layer would start to be unloaded. In this manner, the amount of compression in the compliant layer may be essentially fixed throughout the operating envelope, resulting in much less variation in load throughout the operating envelope. This may enable greater life in the compliant layer while distributing some of the load, reducing stress in the ceramic matrix composite part.

Another benefit of the discrete load points may also be to control the relative location of the mating components throughout a range of loading. In one example, changes in the compliant layer thickness may result in a change in turbine blade tip clearance (which can greatly affect turbine efficiency). Without the load points, the relatively low stiffness of the compliant layer may change a gap between mating components as the loading on the parts changes. If this gap is in the tip clearance stack up, a change in the compliant layer thickness may change the tip clearance. By introducing the discrete load points, some of the load may be distributed (lowering ceramic matrix composite stresses) but the change in relative location between mating components may remain generally fixed over a range of loads.

The compliant layer may provide an additional function of sealing at the joint. This could reduce leakage rates, thereby improving specific fuel consumption, and it may allow flow to be controlled by features that can more reliably meter flow, thereby reducing variability in cooling flows (improved durability and/or specific fuel consumption). Micaboard and other high temperature gasket materials may be used to both distribute load and seal the joint.

In some embodiments, the compliant layer may be made from 3M Interam (MatMount), micaboard gasket material, or other high temperature gasket materials. In some embodiments, the discrete load points may be used along with a compliant layer. In some embodiments, the load is transferred through the compliant layer.

Vibration, relative motion, exposure to hot gas flow, etc. may lead to deterioration of the compliant layer. In some embodiments, the compliant layer is coated. An edge of the layer may be coated with a protective coating. In some embodiments, the surface finish is controller to improve durability of the compliant layer in a vibratory environment or with relative motion. In some embodiments, the compliant layer is located between two pieces of metal foil. In this manner, the metal foil may be the portion of the compliant layer exposed to relative motion, high velocity gas flow, etc.

The load-distribution system may be useful in distributing loads in ceramic matrix composite seal segment applications. This may be applied to a hanger style seal segment. In other embodiments, the load-distribution system may be used to replace a linear wave spring. The wave spring may be susceptible to creep and may be expensive. The compliant layer may improve load distribution due to lower relative stiffness and due to the removal of discrete load lines.

The load-distribution system may be used with ceramic matrix composite vanes. For example, the system could be used with ceramic matrix composite airfoils and endwalls having metal structures on either end constraining and locating the vane. The compliant layer may be used between the ceramic matrix composite vane endwalls and the constraining metal pieces. The compliant layer(s) may provide inherent centering, distribute contact loads, accommodate relative thermal growth, and/or provide sealing around the top of the airfoil to enable secondary flow cooling schemes.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud for use in a gas turbine engine, the turbine shroud comprising
   a metallic carrier arranged around at least a portion of a central axis of the turbine shroud, the metallic carrier having a first mating surface,
   a blade track segment comprising ceramic material and having a second mating surface, the blade track segment configured to be supported by the first mating surface of the metallic carrier,
   a compliant member engaged with the first and second mating surfaces, the compliant member having an uncompressed thickness and being configured to compress to distribute loads transmitted between the first mating surface of the metallic carrier and the second mating surface of the blade track segment during use of the turbine shroud, and
   a plurality of rigid load pads coupled to one of the first and second mating surfaces, each of the plurality of rigid load pads having a second thickness that is less than the uncompressed thickness of the compliant member, and the plurality of rigid load pads configured to engage the other of the first and second mating surfaces when the compliant member is compressed to block further movement of the blade track segment relative to the metallic carrier,
   wherein the complaint member is formed to include an air passage extending through the compliant member to allow fluid communication through the compliant member.

2. The turbine shroud of claim 1, wherein the compliant member includes a radial outer surface and a radial inner surface spaced apart radially from the radial outer surface, the complaint member is formed to define a plurality of receiver apertures extending between the radial outer surface and the radial inner surface of the complaint member, and each of the plurality of receiver apertures is shaped to receive a corresponding rigid load pad.

3. The turbine shroud of claim 2, wherein the plurality of rigid load pads includes at least three rigid load pads.

4. The turbine shroud of claim 3, wherein the plurality of load pads are monolithically formed with the metallic carrier.

5. The turbine shroud of claim 1, further comprising a first metallic sheet positioned between the complaint member and the first mating surface and a second metallic sheet positioned between the complaint member and the second mating surface.

6. A turbine shroud for use in a gas turbine engine, the turbine shroud comprising
   a carrier arranged around a central axis of the turbine shroud, the carrier having a first mating surface,
   a blade track segment having a second mating surface configured to be supported by the first mating surface, and
   a load-distribution system configured to distribute loads transmitted between the second mating surface of the blade track segment and the first mating surface of the carrier, the load-distribution system including a compliant member engaged with the first and second mating surfaces and a plurality of rigid load pads, wherein the compliant member has an uncompressed thickness, each of the plurality of rigid load pads have a second thickness that is less than the uncompressed thickness, and the plurality of rigid load pads are configured to engage the first and second mating surfaces in response to the compliant member being compressed to the second thickness, wherein the compliant member includes an outer surface and an inner surface spaced apart from the outer surface, the complaint member is formed to define a plurality of receiver apertures extending between the outer surface and the inner surface of the complaint member, and each of the plurality of receiver apertures is shaped to receive a corresponding rigid load pad.

7. The turbine shroud of claim 6, wherein the load-distribution system is formed to include an air passage extending through the load-distribution system to allow fluid communication through the load-distribution system.

8. The turbine shroud of claim 6, wherein the load-distribution system further includes a first foil sheet positioned between the complaint member and the first mating surface and a second foil sheet positioned between the complaint member and the second mating surface.

9. The turbine shroud of claim 6, wherein the plurality of rigid load pads includes at least three rigid load pads.

10. The turbine shroud of claim 9, wherein the plurality of load pads are monolithically formed with the carrier.

11. An assembly for use in a gas turbine engine, the assembly comprising a first component arranged around at least a portion of a central axis of the gas turbine engine, a second component comprising ceramic matrix composite materials and being supported by the first component, and a load-distribution system positioned between the first component and the second component, the load-distribution system including a compliant member that extends between the first and second components and a plurality of rigid load pads, the compliant member has an uncompressed thickness, each of the plurality of rigid load pads has a second thickness that is less than the uncompressed thickness, and the plurality of rigid load pads being configured to engage the first and second components in response to the compliant member being compressed to the second thickness, wherein the compliant member includes a first surface and a second surface spaced apart from the first surface, the complaint member is formed to define a plurality of receiver apertures extending between the first surface and the second surface of the complaint member, and each of the plurality of receiver apertures receiver aperture is shaped to receive a corresponding rigid load pad.

12. The assembly of claim 11, wherein the load-distribution system is formed to include an air passage extending through the load-distribution system.

13. An assembly for use in a gas turbine engine, the assembly comprising a first component arranged around at least a portion of a central axis of the gas turbine engine, a second component comprising ceramic matrix composite materials and being supported by the first component, and a load-distribution system positioned between the first component and the second component, the load-distribution system including a compliant member that extends between the first and second components and a plurality of rigid load pads, the compliant member has an uncompressed thickness, each of the plurality of rigid load pads has a second thickness that is less than the uncompressed thickness, and the plurality of rigid load pads being configured to engage the first and second components in response to the compliant member being compressed to the second thickness, wherein the load-distribution system further includes a first sheet positioned between the complaint member and the first component and a second sheet positioned between the complaint member and the second component.

14. The assembly of claim 13, wherein the plurality of load pads are monolithically formed with the first component.

15. The assembly of claim 13, wherein each of the plurality of rigid load pads is spaced apart from another rigid load pad included in the plurality of rigid load pads.

* * * * *